J. L. WILSON & C. O. MILLER.
VEHICLE STEERING WHEEL.
APPLICATION FILED JAN. 4, 1916.
1,237,231.
Patented Aug. 14, 1917.
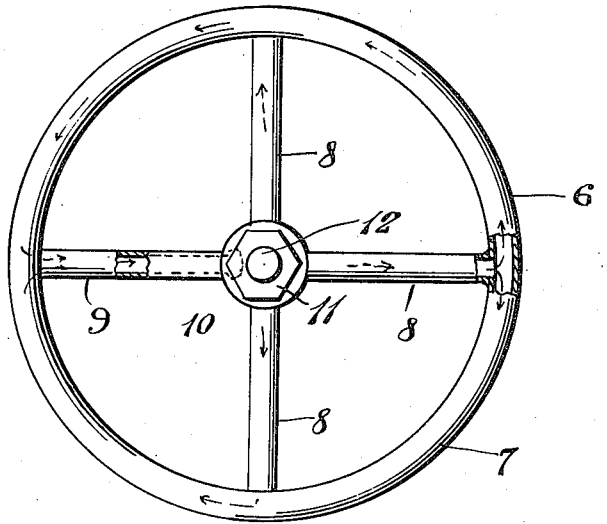
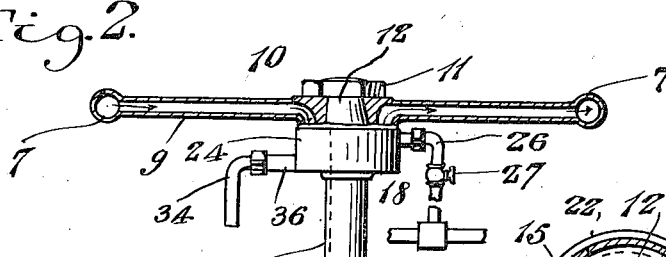
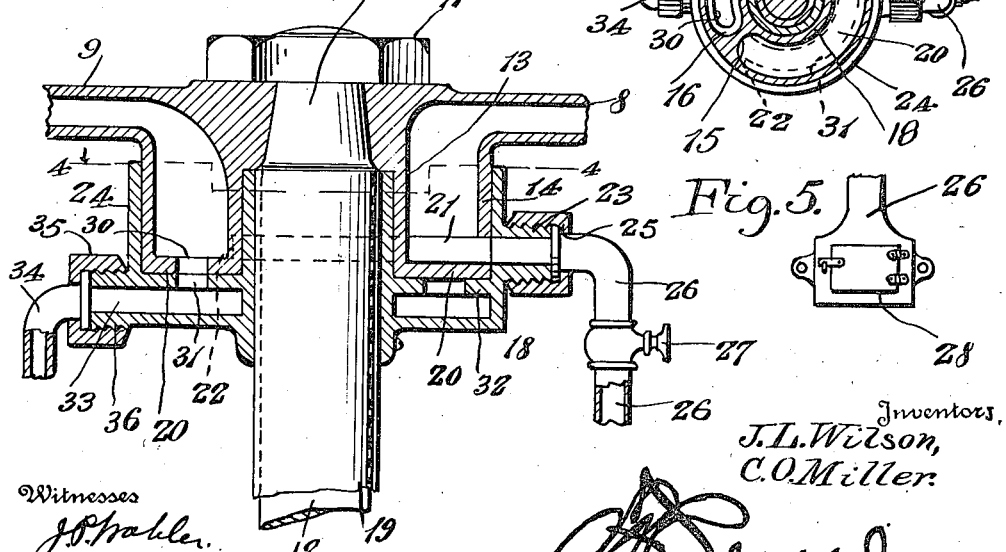
Inventors,
J. L. Wilson,
C. O. Miller.

UNITED STATES PATENT OFFICE.

JOHN L. WILSON AND CHARLIE O. MILLER, OF MOUNT VERNON, OHIO.

VEHICLE STEERING-WHEEL.

1,237,231.

Specification of Letters Patent.

Patented Aug. 14, 1917.

Application filed January 4, 1916. Serial No. 70,157.

*To all whom it may concern:*

Be it known that we, JOHN L. WILSON and CHARLIE O. MILLER, citizens of the United States, residing at Mount Vernon, in the county of Knox and State of Ohio, have invented certain new and useful Improvements in Vehicle Steering-Wheels; and we do hereby declare the following to be a full, clear, and exact description of the invention, such as will enable others skilled in the art to which it appertains to make and use the same.

This invention relates to steering wheels for motor and other vehicles, and has for its primary object to provide a steering wheel of novel construction and means associated therewith for supplying heated air to the rim and spokes of the wheel to retain the latter in a heated condition.

With this and other objects in view, the invention consists in the novel construction, combination and arrangement of parts as will be hereinafter specifically described, claimed and illustrated in the accompanying drawing, in which:

Figure 1 represents a top plan view of the improved steering wheel, partly broken away, Fig. 2 represents a diametrical sectional view through the steering wheel, partly in side elevation, Fig. 3 represents an enlarged detail sectional view through the center portion of the steering wheel, Fig. 4 represents a horizontal sectional view on the line 4—4 of Fig. 3, and Fig. 5 represents a fragmental side elevation of a modified type of heater for the steering wheel.

Referring to the drawing in detail, wherein similar reference numerals designate corresponding parts throughout the several views, the numeral 6 indicates the steering wheel as an entirety, which includes a hollow rim 7 and a plurality of hollow spokes 8 and 9 communicating with the interior of the rim 7 and connected at their inner extremities by a hub, designated generally by the numeral 10, and adapted to be secured by a nut or equivalent means 11 upon the steering post 12 of a vehicle. The hub 10 includes inner and outer spaced depending flanges 13 and 14, respectively, the flanges being connected adjacent the spoke 9 by a pair of spaced partitions 15, defining a chamber 16 communicating with the interior of the spoke 9. The other or relatively large chamber 17 defined by the partitions 15 in the hub communicates with the several spokes 8. A housing, designated generally by the numeral 18, is secured to the steering post housing 19 directly under the hub 10 and in contact with the bottom wall 20 of the hub. The outer flange 14 of the hub is formed with a circumferential opening or slot 21, the ends of which terminate adjacent the partitions 15 and are designated by the numerals 22 in Figs. 3 and 4. The slot 21 registers with a tubular extension 23, carried by the upstanding flange 24 of the housing 18, and thus permits heated air or products of combustion passing through the tubular extension 23 to enter the chamber 17 and circulate through the spokes 8, ring 7 and spoke 9. The tubular extension is connected by a coupling 25 with an inlet or supply pipe 26, in which is arranged a cutoff valve 27.

The supply pipe 26 may be connected with the exhaust pipe of the engine of the motor vehicle, as illustrated in Fig. 2, or may be supplied with heated air from an oil, electric, or other type of heater arranged in a housing 28 connected with the lower extremity of the supply pipe 26, as illustrated in the modification disclosed in Fig. 5.

The heated air, or products of combustion, subsequent to circulating through and heating the spokes 8 and rim 9, enter the spoke 9 and are conducted to the chamber 16. The portion of the bottom 20 of the hub 10 disposed in the chamber 16 is formed with an arcuate opening 30, having permanent communication with a circular opening 31 formed in the top 32 of the hollow housing 18. The products of combustion or heated air pass from the chamber 16 through the openings 30 and 31 to the internal chamber 33 of the housing 18 and are finally exhausted from the chamber 33 by an exhaust pipe 34 connected by a coupling 35 with a tubular extension 36 of the housing 18.

What we claim is:

1. A steering wheel including a hollow hub, said hub connected with a hollow steering wheel by a plurality of hollow spokes, said hub provided with inner and outer flanges, a housing for the hub secured to the steering post housing, said housing for the hub being provided with inner and outer flanges, said outer flange encircling the outer flange of the hollow hub the outer flange of said housing for the hub being provided with an opening and registering with an opening in the outer wall of the hub, said housing for the hub being provided with means for connecting with the intake pipe.

2. A hollow steering wheel in combination with a hollow hub and a plurality of hollow spokes, a housing secured to the housing of the steering post, said first mentioned housing being provided with inner and outer flanges, said outer flange encircling the hollow hub, spaced upper and lower walls carried by said first mentioned housing, the space between the upper and lower walls of said first mentioned housing forming a chamber for the reception of the exhaust heat, the upper wall of said first mentioned housing having an opening registering with an opening in said hub, and means for connecting the space between the upper and lower walls with an exhaust pipe.

3. A steering wheel including a hollow hub, a hollow rim, a plurality of hollow spokes connecting said hollow rim and hub, partitions arranged in said hub dividing the latter into a relatively small and a relatively large chamber, certain of said spokes communicating with the large chamber and certain other of said spokes communicating with said small chamber, a housing for the hollow hub secured to the steering post of a vehicle, said housing having inner and outer flanges, the outer flange encircling the hollow hub and having an opening registering with an opening in the hollow hub, said openings communicating with the relatively large chamber, means carried by said outer flange and communicating with the openings for connection with an intake pipe, a chamber formed in said housing, said housing having an opening registering with an opening in the relatively small chamber in the hub, and means for connecting the chamber in the housing with an exhaust pipe.

In testimony whereof we affix our signatures in presence of two witnesses.

JOHN L. WILSON.
CHARLIE O. MILLER.

Witnesses:
C. F. COLVILLE,
ANNA F. COLWILL.